May 28, 1946.    P. H. BRACE    2,400,975
APPARATUS FOR ELECTRICALLY RESOLVING WATER-IN-OIL EMULSIONS
Filed July 29, 1940
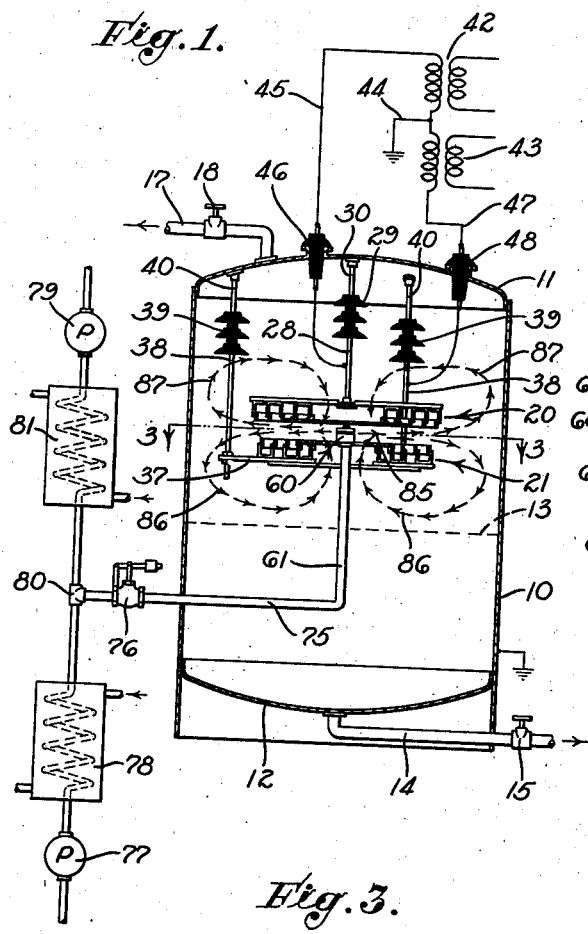
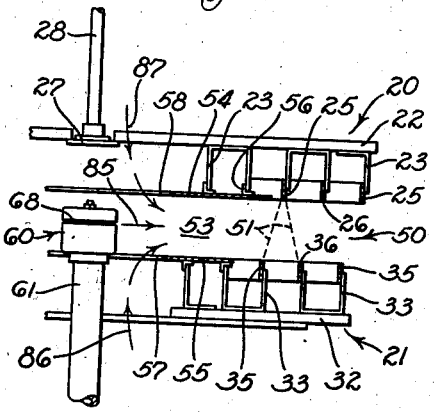
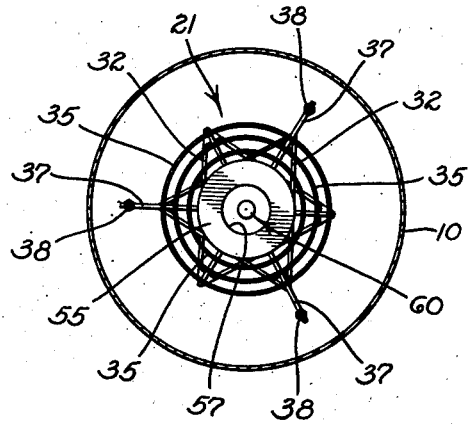
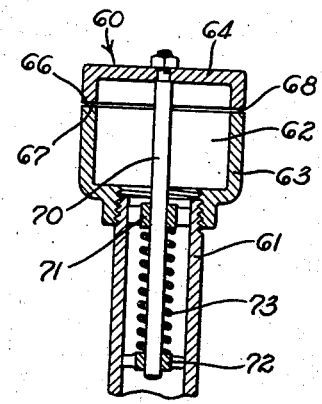
INVENTOR
PAUL H. BRACE
BY HARRIS, KIECH, FOSTER & HARRIS
ATTORNEYS.

Patented May 28, 1946

2,400,975

UNITED STATES PATENT OFFICE 2,400,975

APPARATUS FOR ELECTRICALLY RESOLVING WATER-IN-OIL EMULSIONS

Paul H. Brace, Mount Pleasant, Mich., assignor to Petrolite Corporation, Ltd., Wilmington, Del., a corporation of Delaware Application July 29, 1940, Serial No. 348,105

8 Claims. (Cl. 204—302)

My invention relates to the electric treatment of fluids and, more particularly, to a novel electrode construction for an electric treater adapted for the treatment of emulsions.

Subjection of a water-in-oil emulsion to a high-intensity electric field will cause coalescence of the dispersed water droplets into masses of sufficient size to be readily separable from the oil. Such emulsions may be of the type produced from oil wells, in which event the electric treatment tends to dehydrate the oil. In other instances, the emulsion can be artificially formed. For example, the patent to Harold C. Eddy, No. 2,182,145, discloses a process for purifying oils in which water is mixed therewith to form a water-in-oil dispersion which is subjected to the action of an electric field. In the field, the dispersed water droplets will coalesce and various impurities will become associated with the water to be removed therewith when the electrically-treated constituents are subjected to gravitational separation.

It has been found that when certain emulsions are electrically treated and the constituents separated, there is a tendency for the accumulation of sludge in the separating zone. This sludge comprises unresolved emulsion and, if permitted to build up below the electrodes, will tend to short-circuit the same.

It is an object of the present invention to provide a novel method of electric treatment and a novel electrode structure which reduces sludge tendencies.

Another object of the invention is to move a stream of emulsion successively through electric fields of different character. The first portion of the electric field is preferably one of uniform gradient, such a field being formed, for example, between two spaced plates, a subsequent portion of the electric field being of a concentrated character, for example, a field formed adjacent an edge.

It is another object of the invention to flow an emulsion adjacent a substantially flat portion of an electrode and to move this emulsion subsequently through an electric field which extends to a plurality of edges.

Another object of the invention is to discharge an emulsion into an edge-bounded electric field by use of a pair of plates or relatively flat members, irrespective of whether or not a potential difference is maintained between these members. If the members are of metal, it is often desirable to maintain a field therebetween, though if the members are insulated from each other or are formed of insulating material, the structure can be used to deliver the emulsion to an edge-bounded field in an advantageous manner.

Another object of the invention is to provide an electrode structure including a plurality of edges which are substantially in alignment with a substantially flat plate or the like, and to discharge emulsion in a direction substantially parallel to the plate and with such velocity that it flows beyond the end of the plate and across the edges in sequence.

Another object of the invention is to provide a pair of plates spaced from each other to define a passage directed toward an electric treating space, at least one of the plates including an opening, together with an emulsion-distributing means extending through the opening and discharging the emulsion into the passage.

Another object of the invention is to provide such an electrode structure submerged in a fluid of higher resistivity than the incoming emulsion, and to provide an annular opening between the emulsion-distributing means and that one of the plates through which it extends so that the jet of emulsion draws some of the fluid of higher resistivity into the passage.

Further objects and advantages of the invention will be evident to those skilled in the art from the description which follows.

Referring to the drawing:

Figure 1 is a vertical sectional view of a treater embodying the invention;

Figure 2 is an enlarged fragmentary sectional view of the electrode structure of Figure 1;

Figure 3 is a sectional view taken as indicated by the line 3—3 of Figure 1; and Figure 4 is a vertical sectional view of the emulsion-distributing means shown in Figures 1 and 2.

Referring particularly to Figure 1, the electric treater is shown as including a tank 10 closed at its upper and lower ends by heads 11 and 12. After the treater has been in operation for a period of time, a body of water will form in the lower end of the tank 10, the upper surface thereof being indicated by the numeral 13, a stream of water being withdrawn through a pipe 14 containing a valve 15 acting to maintain a superatmospheric pressure within the tank. Above the surface 13 is an oil environment including emulsion constituents undergoing separation. The water content in this separating zone progressively decreases toward the upper end thereof so that the treated oil can be withdrawn through a pipe 17 including a valve 18 which is also restricted in such manner as to maintain the desired superatmospheric pressure in the tank.

An electrode means is suspended in this oil environment and is shown as including upper and lower electrodes 20 and 21. Referring particularly to Figures 1, 2, and 3, the upper electrode 20 is shown as including a support 22 comprising a star-shaped interstitial structure. Depending from attachment members 23 secured to the lower side thereof is a plurality of concentric rings 25 defining edges 26, these rings being separated from each other to define spaces capable of conducting settling constituents transversely through the electrode 20. These rings may be formed of ribbon-like metal, suitably secured to the attachment members 23, the construction being such that the edges 26 are substantially in alignment.

The upper electrode 20 is supported, at substantially the position shown in Figure 1, by any suitable means such as a plate 27 connected to inward-extending portions of the support 22. This plate 27 is secured to the lower end of a rod 28 suspended from a string of insulators 29 which is carried by a hanger 30 from the upper wall 11.

Similarly, the lower electrode 21 comprises a star-shaped support 32 to which attachment members 33 are secured to extend upward therefrom. At the upper end of these attachment members are retained spaced concentric rings 35 providing edges 36 which are preferably disaligned with respect to the edges 26 of the upper electrode but which edges 36 are in substantial alignment with each other. This support 32 provides outward-extending arms 37 adjustably connected to rods 38 so as to be capable of vertical adjustment with respect to the electrode 20. Strings of insulators 39 support the rods 38 and are carried by hangers 40. The star-shaped supports 22 and 32 are not, per se, a part of the present invention and are described and shown more in detail in the copending application of Waterman, et al., Serial No. 326,274.

To establish and maintain a potential difference between the upper and lower electrodes 20 and 21, I have shown transformers 42 and 43 connected in additive relationship. One terminal of each of the secondary windings of these transformers is grounded as indicated at 44. The remaining high-voltage terminal of transformer 42 is connected by a conductor 45 to the rod 28, this conductor extending through a bushing 46. Similarly, the remaining high-voltage terminal of the transformer 43 is connected to one of the rods 38, and thus to the lower electrode 21, by a conductor 47 extending through a bushing 48. By this mode of connection, each of the electrodes 20 and 21 is maintained at a potential above ground, and if the transformers 42 and 43 are of substantially equal voltage, the potential between these electrodes will be twice the potential between either electrode and any grounded portion of the equipment, for example, the emulsion distributor to be later described or the tank 10.

When the electrodes 20 and 21 are thus energized, a high potential field of non-uniform voltage gradient will be established in a treating space 50 bounded by the edges 26 and 36. The field will concentrate at these edges and will be more intense at a position adjacent any particular edge than at a position spaced therefrom toward the center of the treating space 50. Also, the electric field as a whole will be more intense along dotted lines such as indicated by the numeral 51.

Before the emulsion enters the treating space 50, the invention contemplates that it should move along a passage 53, shown as being formed between upper and lower plates 54 and 55. These plates comprise substantially impervious and substantially flat portions providing surfaces which are in substantial alignment with the edges 26 and 36, respectively. Stated in other words, the edges 36, for example, are substantially in alignment with a line projected from the surface of the plate 55.

The preferred construction is to support the plates 54 and 55 on the electrodes 20 and 21. Thus, the plate 54 is shown as being connected by angular members 56 to the attachment members 23, while the plate 55 is similarly connected to the attachment members 33. In this manner, the plates 54 and 55 can be made a part of the electrode structures 20 and 21, respectively, and if these plates are of metal, an electric field will be established in the passage 53. On the other hand, if the plates 54 and 55 are formed of insulating material or are insulated from the electrodes 20 and 21, no substantial treatment of the emulsion will take place during flow along the passage 53.

If the plates 54 and 55 are formed of metal and are electrically connected to the electrodes 20 and 21, the field in the passage 53 will be of uniform gradient and will not be concentrated at any section. Such a field is capable of preliminarily treating an emulsion discharged thereinto and advantageously prepares the emulsion for subsequent treatment in the treating space 50 in which the emulsion is subjected to a non-uniform field which is highly concentrated adjacent the edges 26 and 36.

As shown, the lower plate 55 provides an opening 57. Likewise, in the preferred embodiment of the invention, the upper plate 54 provides an opening 58, these openings permitting access to the passage 53 of the liquid in which the electrode structure is submerged. In operation, best results have been obtained by using an upper plate 54 which is of somewhat larger diameter than the lower plate 55 and in which the opening 58 is slightly larger than the opening 57. On the other hand, the diameter of the opening 57 should be such as to prevent short-circuiting of the lower plate 55, if formed of metal, and the distributor means to be later described.

The present invention contemplates the movement of the emulsion to be treated through the passage 53 and subsequently through at least a portion of the treating space 50. Acting to deliver the emulsion to the passage 53 is an emulsion distribution system, shown as including an emulsion distributor 60. It is desirable that this emulsion distributor be of such nature as to direct a stream or thin sheet of emulsion outward in the passage 53 in a direction substantially parallel to the plates 54 and 55 and with an initial velocity sufficient to carry the stream beyond the peripheries of these plates and successively across the edges 26 and the edges 36, by which I have reference to a transverse movement of the emulsion across the high gradient zones of the treating space 50.

Figure 4 best shows the details of this emulsion distributor 60. Referring thereto, emulsion delivered under pressure through a pipe means 61 enters a chamber 62 formed by a member 63 open at its upper end and a head member 64 disposed thereabove. These members provide, respectively, contiguous surfaces 66 and 67 which, when emulsion is flowing through the distributor, are spaced slightly from each other to define an annular discharge orifice 68. This will form a thin sheet of emulsion moving radially outward from the distributor 60. As shown, this sheet of emulsion enters the passage 53 substantially midway between the plates 54 and 55, though the horizontal position of the annular discharge orifice 68 with respect to the plates 54 and 55 can be varied without departing from the spirit of the invention. Preferably, the thickness of the emulsion stream discharged from the annular orifice 68 is made to vary with the quantity of emulsion contained in the stream. This can be accomplished by use of a pin 70 secured to and depending from the head member 64 to extend into the pipe means 61. A guide means 71 in the form of a spider tends to slidably mount one portion of the pin 70, and the lower end of this pin may carry a guide means in the form of a spider 72 which is vertically movable in the pipe means 61 to center the pin 70. A spring 73 compressed between the spiders 71 and 72 moves the head member 64 resiliently toward the member 63. When no emulsion is flowing through the distributor, the end surfaces 66 and 67 are in sealing relationship. When emulsion is delivered to the pipe means 61 under pressure, the head member 64 rises against the action of the spring 73 to distribute this emulsion as an outward-moving stream.

The pipe means 61 communicates with a pipe 75 extending to a position outside the tank and which may include a weight-loaded valve 76 if the treater is to be used for electric purification; otherwise the incoming emulsion can be delivered under pressure to the pipe 75 by any suitable means. In the electric purification process, a stream of oil is delivered to the pipe 75 by a pump 77 and a heat exchanger 78 may be used to heat the oil to the desired extent. Similarly, a pump 79 delivers a proportioned stream of water to a T 80, this water being heated, if desired, by a heat exchanger 81. This purification process can be operated in accordance with the patent to Harold C. Eddy, supra, and, if desired, the oil and water can be mixed to the desired extent in the weight-loaded valve 76.

As the sheet of emulsion is discharged outward in the passage 53 in a direction indicated by arrows 85 of Figures 1 and 2, it establishes circulation paths within the tank 10 substantially as shown in Figure 1. For example, it draws into the passage 53 through the opening 57 and from a position below the lower electrode 21 a stream of emulsion constituents, indicated by arrows 86, these constituents tending to mix to some extent with the discharged emulsion during flow along the passage 53 and particularly in the treating space 50. Similarly, the jet action of the emulsion discharged as indicated by the arrows 85 pulls treated emulsion constituents downward through the opening 58 from a position above the upper electrode 20, as indicated by arrows 87. Correspondingly, closed circulation paths are established around and through the electrodes. The relative amounts of fluid entering the passage 53, as indicated by the arrows 86 and 87, are controlled respectively by the size of the openings 57 and 58 of the plates 55 and 54. By changing these openings, it is possible to control accurately the relative amounts of recirculated fluid drawn from above and below the electrode means.

In practice, it has been found that the use of the plates 54 and 55 can be made to increase the amount of recirculation over and above an electrode system in which these plates are eliminated. This is particularly desirable in treating those emulsions which tend to sludge. By way of example, sludge accumulations usually occur at or immediately above the surface 13, and by using an appropriate recirculation, as indicated by the arrows 86, this sludge tends to be picked up and returned to the passage 53 and the treating space 50, this re-treatment continuing repeatedly until the unresolved emulsion present in the sludge is broken and resolved into its oil and water constituents.

Another important advantage of the present invention lies, I believe, in a novel pre-treatment of the emulsion before it enters the treating space 50. If the plates 54 and 55 were eliminated and concentric electrodes substituted, the stream of emulsion would be immediately subjected to an edge-bounded electric field which, of course, concentrates adjacent the edges of the concentric rings. If the gradient of the field is made too high, there is a tendency in the highest gradient portion of the field for dispersed water droplets to be broken up electrically into smaller droplets, even though the same field in its less intense portions may serve to coalesce the dispersed droplets of the emulsion. Such electric re-dispersion is usually to be avoided. Movement of the emulsion through the passage 53 preparatory to entering the high gradient fields in the treating space 50 appears somehow to be beneficial in this respect. Pre-treatment in the passage 53, whether merely by mixing or by electric action, has been found to be very desirable. Correspondingly, it is probable that this factor is also of importance in the capability of this electrode system of avoiding sludge difficulties, for it is known that electrical re-dispersion can be one factor in sludge production.

The invention is well adapted to the treatment of either naturally-occurring or artificially-formed emulsions. Operating conditions in the treater 10, such as temperature, pressure, and potential between the electrodes can follow practices now known in the art and need not be here detailed. While the invention has been shown in combination with annular electrodes, this is not always essential in view of the fact that beneficial results can be obtained by flowing the emulsion along a plate and thence successively across a number of edges, irrespective of whether the plate or the edges are annular. However, it is desirable, particularly if an electric field is established in the passage 53, to have this field of substantially uniform voltage gradient, in which event the subsequent treatment in the non-uniform field will be very beneficial.

Various changes and modifications can be made without departing from the spirit of the invention, it being understood that the detailed description of an exemplified embodiment is made without intent of limiting the invention thereto.

I claim as my invention:

1. In combination in an electric treater for emulsions and the like: an upper electrode providing a plurality of aligned edges; a lower electrode providing a plurality of aligned edges spaced from said edges of said upper electrode to define a treating space, said electrodes being disposed in an oil environment; means for impressing a potential difference between said electrodes to form an electric field in said treating space; upper and lower plates disposed at one end of said treating space, said plates respectively being positioned substantially opposite said electrodes and being spaced from each other to define a passage providing intake and discharge ends respectively communicating openly with said oil environment and with said treating space; and introduction means for introducing a stream of the fluid to be treated into said passage in a direction to move therealong and then therefrom into said treating space, said introduction means including a discharge orifice directed to project said stream of fluid into said passage in spaced relationship with and at a position between said plates to draw into said intake end of said passage some of the surrounding oil whereby this oil moves with the introduced fluid along said passage and into said treating space.

2. A combination as defined in claim 1, including means for impressing a potential difference between said upper and lower plates for establishing an electric field therebetween which acts on said fluid stream before discharge into said treating space.

3. In combination in an electric treater, an electrode system and an emulsion distribution system adapted to be positioned in an environment of oil-continuous material of a tank including: an upper annular electrode including a plurality of depending annular rings around the central opening thereof, said rings providing lower edges; a lower annular electrode including a plurality of upward-extending rings around the central opening thereof, said rings providing the central opening thereof, said rings providing upper edges spaced from said lower edges to define a treating space; means for electrically insulating said electrodes from each other whereby a potential difference between said upper and lower electrodes will result in the establishment of intense electric fields between the edges of said upper and lower electrodes; upper and lower spaced annular plates disposed respectively adjacent said central openings of said upper and lower annular electrodes to provide a passage having a discharge portion opening on said treating space and having an inlet portion in open communication with said oil-continuous material through the openings of said annular plates; and an emulsion distributor for discharging a stream of emulsion into said inlet portion of said passage in an outward direction and at a section between said plates in such manner and with sufficient velocity to move said emulsion into and along said passage and into said treating space and to draw oil-continuous material into said inlet end of said passage through said openings of said annular plates to advance through said passage with said emulsion and discharge with said emulsion into said treating space.

4. In an electric treater for emulsions, the combination of: a container; an upper annular interstitial electrode in said container and providing a throat; a lower annular interstitial electrode in said container and providing a throat, said electrodes being spaced to define an annular treating space and being submerged in a fluid inside said container; emulsion distributing means adjacent the center of said annular space for discharging a stream of emulsion outward along said treating space in a manner tending to draw fluid into said treating space by aspiration from a zone above said upper electrode through the throat thereof and from a zone below said lower electrode through the throat thereof; a pair of spaced annular plates coaxial with said emulsion distributing means and disposed in planes parallel to and on opposite sides of the stream of emulsion, said annular plates being respectively electrically connected to and disposed in the throats of said electrodes whereby the aspirated fluid enters the space between the annular plates through the central openings of these annular plates and flows outwardly into said annular treating space with said emulsion; and means for establishing electric fields between said annular plates and in said annular treating space.

5. In an electric treater for emulsions, a submerged-type recirculating electrode unit, including in combination: a set of rings of different diameter; means for mounting said set of rings in horizontally-spaced concentric relationship to provide annular passages therebetween which communicate openly between the submerging liquid above and below said set of rings, said means electrically connecting said rings together; a substantially horizontal annular plate within the innermost ring of said set of rings; an interstitial horizontally-extending annular electrode spaced vertically with respect to said rings to provide a treating space; means for establishing an electric field in said treating space; a substantially horizontal annular plate partially closing the opening of said annular electrode and spaced vertically with respect to said first-named annular plate to define an inner space communicating with said treating space; pipe means extending through the central opening of one of said annular plates, said pipe means being of smaller size than this opening to provide an annular opening communicating between the submerging liquid and said inner space; and means for directing a substantially horizontal stream of emulsion radially into said inner space with sufficient velocity to flow therethrough into said treating space and to draw a portion of said submerging liquid into said inner space by aspiration through said annular opening between said pipe means and said one annular plate and through the central opening of the other annular plate, said means including an emulsion-distributor in said inner space and providing an orifice directed radially into said inner space at an elevation between said annular plates.

6. In an electric treater for emulsions, a submerged-type recirculating electrode unit, including in combination: a set of rings of different diameter; means for mounting said set of rings in horizontally-spaced concentric relationship to provide annular passages therebetween which communicate openly between the submerging liquid above and below said set of rings, said means electrically connecting said rings together; a substantially horizontal plate within the innermost ring of said set of rings; another set of rings of different diameter; means for mounting said other set of rings in horizontally-spaced concentric relationship to provide annular passages therebetween which communicate openly between the submerging liquid above and below said other set of rings, said means electrically connecting said rings of said other set together; means for supporting said other set of rings and said mounting means therefor at a position spaced vertically with respect to the first-named set of rings to provide a treating space between said rings; a substantially horizontal annular plate within the innermost ring of said other set of rings and spaced from said first-named plate to define an inner space communicating with said treating space; pipe means extending through the central opening of said annular plate, said pipe means being of smaller size than said opening to provide an annular opening communicating between the submerging liquid and said inner space; and means for directing a horizontal stream of emulsion radially into said inner space with sufficient velocity to flow therethrough into said treating space and to draw a portion of said submerging liquid into said inner space through said annular opening by aspiration, said means including an emulsion distributor in said inner space and providing an orifice directed radially into said inner space at an elevation between said annular plates.

7. In an electric treater for emulsions, a submerged-type electrode unit including, in combination: an upper circular plate and a lower circular plate disposed therebeneath to define an outwardly-extending passage therebetween, one of said plates providing an opening, said plates being disposed in an environment of oil-continuous material; pipe means extending through said opening of said one plate and being smaller than this opening to provide an annular space through which oil-continuous material may enter said outwardly-extending passage, the other of said plates also providing an opening through which oil-continuous material may enter said outwardly-extending passage; discharge means connected to said pipe means and providing an annular discharge orifice directed into and along said passage for discharging emulsion from said pipe means to flow as a stream along and through said outwardly-extending passage, said plates being sufficiently close to said stream that streams of oil-continuous material are aspirated into said outwardly-extending passage through said annular space and through the opening of said other plate; and upper and lower electrode means insulated from each other and disposed respectively around and extending outwardly beyond the peripheries of said upper and lower circular plates and respectively providing electrode surfaces at substantially the same horizontal positions as said upper and lower plates for establishing an electric field into which moves the emulsion flowing outwardly from said passage.

8. In an electric treater for emulsions, an electrode unit for establishing an electric field within an electrode-unit-submerging liquid, said electrode unit including, in combination: means for discharging radially outward and substantially horizontally a thin sheet of emulsion at a position within the submerging liquid, said means including a distributor providing an annular discharge orifice from which said sheet of emulsion issues; an upper submerged electrode structure comprising a plurality of electrically-connected concentric rings spaced horizontally from each other and providing lower field-bounding edges substantially in alignment with each other, said upper electrode structure also providing a centrally-disposed upper annular plate substantially in alignment with said field-bounding edges of said rings; a lower submerged electrode structure comprising a plurality of electrically-connected concentric rings spaced horizontally from each other and providing upper field-bounding edges substantially in alignment with each other, said lower electrode structure also providing a centrally-disposed lower annular plate substantially in alignment with said field-bounding edges of said rings of said lower electrode structure; and means for insulating said electrode structures from each other and for mounting said upper electrode structure concentric with said distributor in such position that said upper annular plate is above said annular discharge orifice and for mounting said lower electrode structure concentric with said distributor in such position that said lower annular plate is below said annular discharge orifice whereby the field-bounding edges of said upper and lower electrode structures are spaced to define a treating space and said upper and lower annular plates are spaced to define an inner space into which said sheet of emulsion is discharged by said distributor, the velocity of discharge being sufficient to move the emulsion from said inner space into said treating space and the vertical spacing of said upper and lower annular plates being such that the discharged sheet of emulsion aspirates the submerging liquid into said inner space through the openings of both annular plates.

PAUL H. BRACE.